(12) United States Patent
Nagata et al.

(10) Patent No.: US 12,552,412 B2
(45) Date of Patent: Feb. 17, 2026

(54) CONTROL DEVICE AND CONTROL METHOD OF VEHICLE, AND NON-TEMPORARY STORAGE MEDIUM

(71) Applicants: TOYOTA JIDOSHA KABUSHIKI KAISHA, Toyota (JP); DENSO CORPORATION, Kariya (JP)

(72) Inventors: Yu Nagata, Chofu (JP); Keiichi Uno, Kariya (JP)

(73) Assignees: TOYOTA JIDOSHA KABUSHIKI KAISHA, Tokyo (JP); DENSO CORPORATION, Kariya (JP)

( * ) Notice: Subject to any disclaimer, the term of this patent is extended or adjusted under 35 U.S.C. 154(b) by 105 days.

(21) Appl. No.: 18/403,367

(22) Filed: Jan. 3, 2024

(65) Prior Publication Data
US 2024/0262387 A1    Aug. 8, 2024

(30) Foreign Application Priority Data
Feb. 2, 2023  (JP) ................................. 2023-014897

(51) Int. Cl.
| | | |
|---|---|---|
| *B60W 60/00* | (2020.01) | |
| *B60W 30/02* | (2012.01) | |
| *B60W 50/14* | (2020.01) | |

(52) U.S. Cl.
CPC ........ *B60W 60/0015* (2020.02); *B60W 30/02* (2013.01); *B60W 50/14* (2013.01); *B60W 2420/403* (2013.01); *B60W 2530/10* (2013.01); *B60W 2720/106* (2013.01)

(58) Field of Classification Search
CPC ................. B60W 30/02; B60W 50/14; B60W 2420/403; B60W 2530/10; B60R 2300/8006
See application file for complete search history.

(56) References Cited

U.S. PATENT DOCUMENTS

| | | | |
|---|---|---|---|
| 10,118,577 B1 * | 11/2018 | Sweeney | B60W 60/00 |
| 2022/0266709 A1 * | 8/2022 | Hinata | B60R 11/02 |
| 2023/0124314 A1 * | 4/2023 | Foster | B60W 60/0011 |
| | | | 701/26 |

FOREIGN PATENT DOCUMENTS

JP    2022158041 A  * 10/2022

* cited by examiner

*Primary Examiner* — Toya Pettiegrew
(74) *Attorney, Agent, or Firm* — Oliff PLC

(57) ABSTRACT

A control device according to the present disclosure is a control device of a vehicle including a control unit configured to acquire loading information indicating a loading state of cargo in a vehicle cabin of the vehicle, determine whether the loading information meets a predetermined loading condition, and issue a notification prompting a change in the loading state of the cargo when the loading information meets the predetermined loading condition.

20 Claims, 4 Drawing Sheets

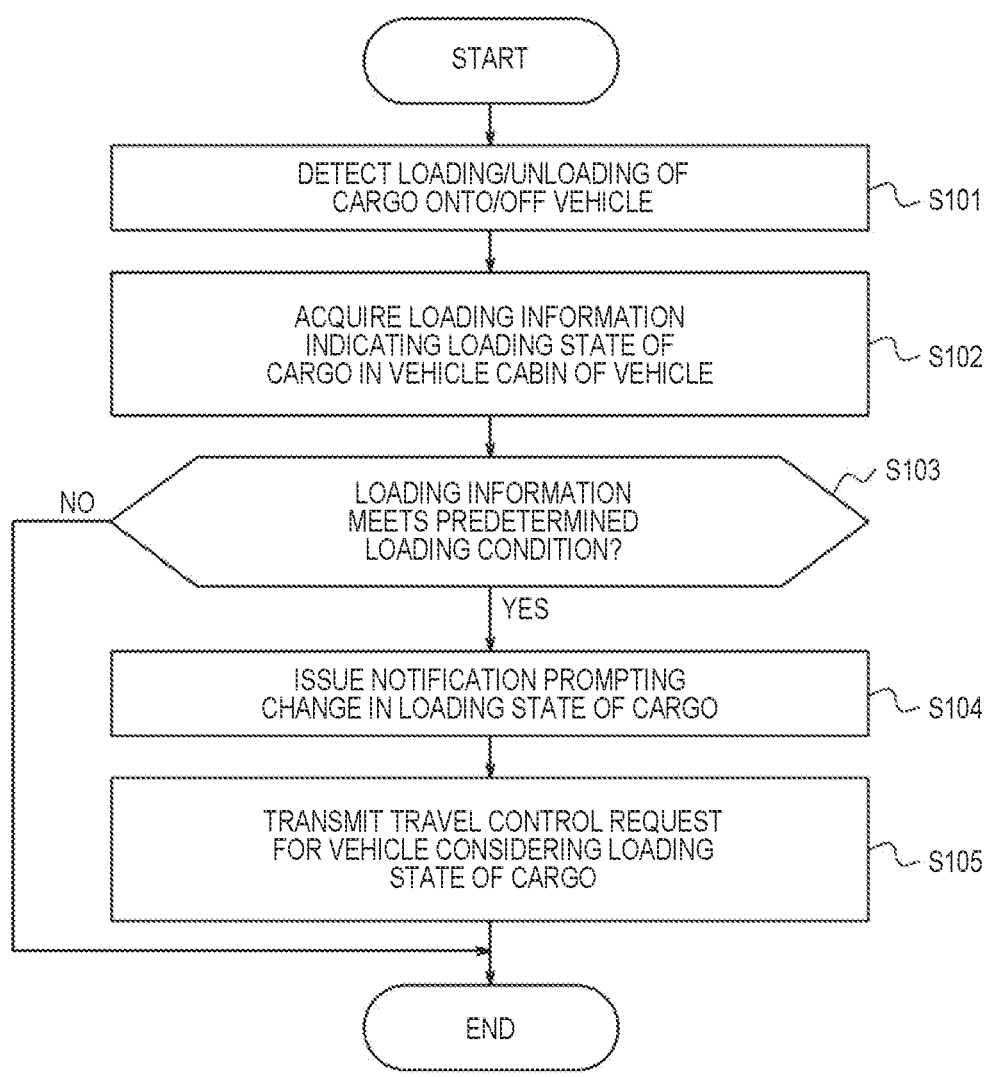

CONTROL DEVICE AND CONTROL METHOD OF VEHICLE, AND NON-TEMPORARY STORAGE MEDIUM

CROSS-REFERENCE TO RELATED APPLICATION

This application claims priority to Japanese Patent Application No. 2023-014897 filed on Feb. 2, 2023 incorporated herein by reference in its entirety.

BACKGROUND

1. Technical Field

The present disclosure relates to a control device and a control method of a vehicle, and a non-transitory storage medium.

2. Description of Related Art

In recent years, technologies for ascertaining the state of cargo loaded on a vehicle have emerged. For example, Japanese Unexamined Patent Application Publication No. 2022-158041 discloses a vehicle cabin monitoring system that captures images of people and cargo in a vehicle cabin with a camera of a vehicle, obtains their volume, and calculates a congestion rate in the vehicle.

SUMMARY

There is a demand for further improvement in the usefulness of technology for ascertaining a state of cargo loaded on a vehicle. For example, a loading state of cargo in a vehicle can affect the safety of the cargo, or the traveling performance of the vehicle, such as the stability or ride comfort of the vehicle, so when loading cargo onto a vehicle, a human visually confirms the validity of the loading state of the cargo. Therefore, it is required to automatically determine the validity of the loading state of the cargo in the vehicle.

The present disclosure provides a control device and a control method of a vehicle, and a non-temporary storage medium that can improve the usefulness of technology for ascertaining a state of cargo loaded on the vehicle.

A first aspect of the present disclosure relates to a control device of a vehicle including a control unit. The control unit is configured to acquire loading information indicating a loading state of cargo in a vehicle cabin of the vehicle, determine whether the loading information meets a predetermined loading condition; and issue a notification prompting a change in the loading state of the cargo when the loading information meets the predetermined loading condition.

In the first aspect, the loading information may include an image of the vehicle cabin captured by a camera.

In the first aspect, the loading information may include information on the weight of the cargo in the vehicle cabin acquired by a weight sensor.

In the first aspect, the predetermined loading condition may include that a predetermined marking is applied to the cargo.

In the first aspect, the control unit may be further configured to transmit a travel control request for the vehicle in consideration of the loading state of the cargo when the loading information meets the predetermined loading condition.

In the first aspect, the vehicle may be a vehicle that can travel by autonomous driving, and the travel control request may include a change in a control value of speed or acceleration during autonomous driving of the vehicle.

In the first aspect, the control unit may be further configured to acquire a measured value of speed or acceleration of the vehicle, and adjust the control value based on the measured value.

In the first aspect, the control unit may be configured not to change the control value in an emergency while the vehicle is traveling.

A second aspect of the invention relates to a control method of a vehicle executed by one or more computers. The control method includes acquiring loading information indicating a loading state of cargo in a vehicle cabin of the vehicle, determining whether the loading information meets a predetermined loading condition; and issuing a notification prompting a change in the loading state of the cargo when the loading information meets the predetermined loading condition.

In the second aspect, the loading information may include an image of the vehicle cabin captured by a camera.

In the second aspect, the loading information may include information on the weight of the cargo in the vehicle cabin acquired by a weight sensor.

In the second aspect, the predetermined loading condition may include that a predetermined marking is applied to the cargo.

In the second aspect, the control method may further include transmitting a travel control request for the vehicle in consideration of the loading state of the cargo when the loading information meets the predetermined loading condition.

In the second aspect, the vehicle may be a vehicle that can travel by autonomous driving, and
the travel control request may include a change in a control value of speed or acceleration during autonomous driving of the vehicle.

A third aspect of the present disclosure relates to a non-temporary storage medium storing an instruction executable by one or more processors and causing the one or more processors to perform functions. The functions include acquiring loading information indicating a loading state of cargo in a vehicle cabin of the vehicle, determining whether the loading information meets a predetermined loading condition, and issuing a notification prompting a change in the loading state of the cargo when the loading information meets the predetermined loading condition.

In the third aspect, the loading information may include an image of the vehicle cabin captured by a camera.

In the third aspect, the loading information may include information on the weight of the cargo in the vehicle cabin acquired by a weight sensor.

In the third aspect, the predetermined loading condition may include that a predetermined marking is applied to the cargo.

In the third aspect, the function may further include transmitting a travel control request for the vehicle in consideration of the loading state of the cargo when the loading information meets the predetermined loading condition.

In the third aspect, the vehicle may be a vehicle that can travel by autonomous driving, and the travel control request may include a change in a control value of speed or acceleration during autonomous driving of the vehicle.

With each aspect of the present disclosure, the usefulness of technology for ascertaining a state of cargo loaded on a vehicle is improved.

BRIEF DESCRIPTION OF THE DRAWINGS

Features, advantages, and technical and industrial significance of exemplary embodiments of the invention will be described below with reference to the accompanying drawings, in which like signs denote like elements, and wherein:

FIG. 4 is a flow chart illustrating an operation of the control device of the vehicle.

DETAILED DESCRIPTION OF EMBODIMENTS

An embodiment of the present disclosure will be described below.

Outline of Embodiment

Figure 1:
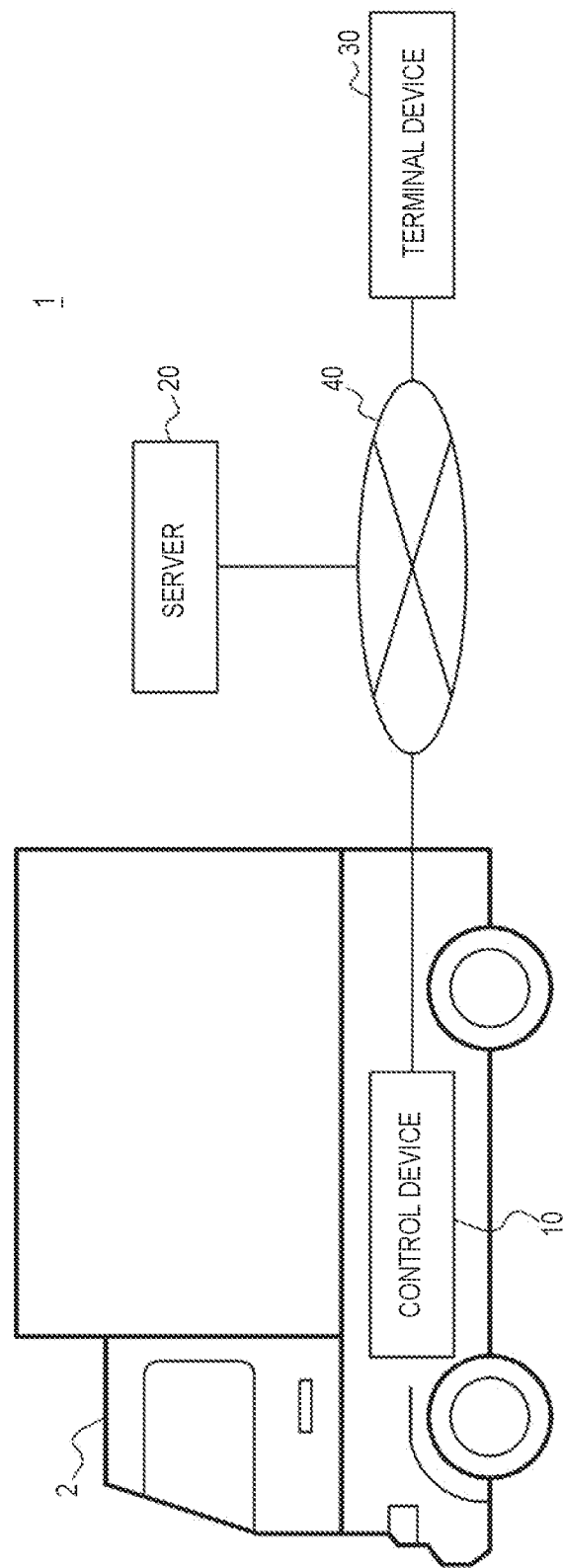
FIG. 1 is a block diagram illustrating a schematic configuration of a vehicle control system according to an embodiment of the present disclosure.

An overview of a vehicle control system 1 according to an embodiment of the present disclosure will be described with reference to FIG. 1. FIG. 1 is a block diagram illustrating a schematic configuration of a vehicle control system 1. The vehicle control system 1 includes a control device 10 of a vehicle 2, a server 20, and a terminal device 30.

The vehicle 2 is, for example, a truck. However, the vehicle 2 is not limited to a truck, and may be any vehicle capable of loading cargo, such as a passenger car, bus, and motorcycle. The vehicle 2 has the control device 10. The control device 10 is composed of one or more computers. In the present embodiment, the control device 10 has both a cabin management function and an autonomous driving function.

The cabin management function is a function for managing the cabin of the vehicle 2. The control device 10 having such functions may be, for example, a computer such as an electronic control unit (ECU). The vehicle cabin is a space in the vehicle 2 in which cargo can be loaded, such as a cargo compartment, a cargo bed, or a trunk room of the vehicle 2. However, the vehicle cabin may be a space in the vehicle 2 where people riding in the vehicle 2 can stay, not limited to cargo, such as a passenger room of the vehicle 2.

The autonomous driving function is a function related to autonomous driving of the vehicle 2. The control device 10 having such functions may be, for example, an autonomous driving system (ADS), advanced driver assistance systems (ADAS), or a computer such as an ECU. The control device 10 can realize traveling by autonomous driving of the vehicle 2 through the autonomous driving function. The level of autonomous driving of the vehicle 2 may correspond to, for example, level 3 to level 4 in the society of automotive engineers (SAE) classification.

In the present embodiment, the vehicle 2 may be configured to travel by autonomous driving according to a travel plan while being remotely controlled by an operator at a remote location, as necessary. The vehicle 2 may be, for example, a truck that travels along a travel route described in the travel plan without a driver and conductor. However, the level of autonomous driving of the vehicle 2 is not limited to the level described above. Alternatively, the vehicle 2 may be a vehicle 2 driven by a human with or without the assistance of the control device 10.

In the present embodiment, the "travel plan" of the vehicle 2 is the traveling schedule of the vehicle 2. The travel plan of the vehicle 2 includes, for example, information such as a departure point, a waypoint point, a destination, a travel route along which the vehicle 2 travels, traffic rules, a travel time zone, estimated time of departure from a departure point, estimated time of arrival at a waypoint point, and estimated time of arrival at a destination. When the vehicle 2 is a truck, the waypoint or destination may be a cargo loading/unloading point. In the present disclosure, "loading/unloading" of cargo includes at least one of loading or unloading of cargo. However, the travel plan for the vehicle 2 may 2 may include information other than the information described above.

The server 20 is composed of one or more computers. In the present embodiment, the server 20 may be composed of one computer, or may be composed of a plurality of computers capable of communicating with each other, such as a cloud computing system.

The server 20 supports traveling of the vehicle 2. For example, the server 20 realizes remote control of the vehicle 2 by an operator via the terminal device 30. Also, for example, the server 20 generates, updates, and manages the travel plan of the vehicle 2.

The terminal device 30 is, for example, a personal computer, but is not limited to this, and may be any computer such as a smartphone or a tablet terminal. In the present embodiment, the terminal device 30 can be used by an operator who remotely controls the vehicle 2. The remote control of the vehicle 2 may include control related to traveling of the vehicle 2, such as acceleration, deceleration, or steering of the vehicle 2, for example. Further, the remote control of the vehicle 2 may include control other than the traveling of the vehicle 2, such as opening and closing the door, confirming that a passenger is seated, or making an announcement inside/outside the vehicle.

In FIG. 1, one control device 10, one server 20, and one terminal device 30 are illustrated for convenience of description. However, the vehicle control system 1 may include any number of control devices 10, servers 20, and terminal devices 30. The control device 10, the server 20, and the terminal device 30 are communicably connected to a network 40 including, for example, the Internet and a mobile communication network.

Although details will be described below, in the vehicle control system 1 described above, the control device 10 is installed in the vehicle 2 and used to ascertain a loading state of cargo in the vehicle cabin of the vehicle 2. Specifically, the control device 10 acquires loading information indicating the loading state of cargo in the vehicle cabin of the vehicle 2 by using, for example, a camera or a weight sensor installed in the vehicle 2. The control device 10 determines whether the loading information corresponds to a predetermined loading condition. The predetermined loading condition is, for example, a cargo loading condition that can affect the safety of cargo or the traveling performance of the vehicle 2. When the loading information satisfies the predetermined loading condition, the control device 10 issues a notification prompting a change in the loading state of the cargo.

Thus, according to the present embodiment, the control device 10 of the vehicle 2 can automatically issue a notification prompting a change in the loading state of the cargo when the state of the cargo loaded on the vehicle 2 may affect the safety of the cargo or the traveling performance of the vehicle 2. As a result, even when a person who can manage the cargo in the vehicle cabin is not in the vehicle 2, the safety of the cargo loaded in the vehicle cabin or the traveling performance of the vehicle 2 is less likely to deteriorate. Therefore, according to the present embodiment, it is possible to improve the usefulness of the technology for managing the vehicle cabin of the vehicle 2.

Figure 2:
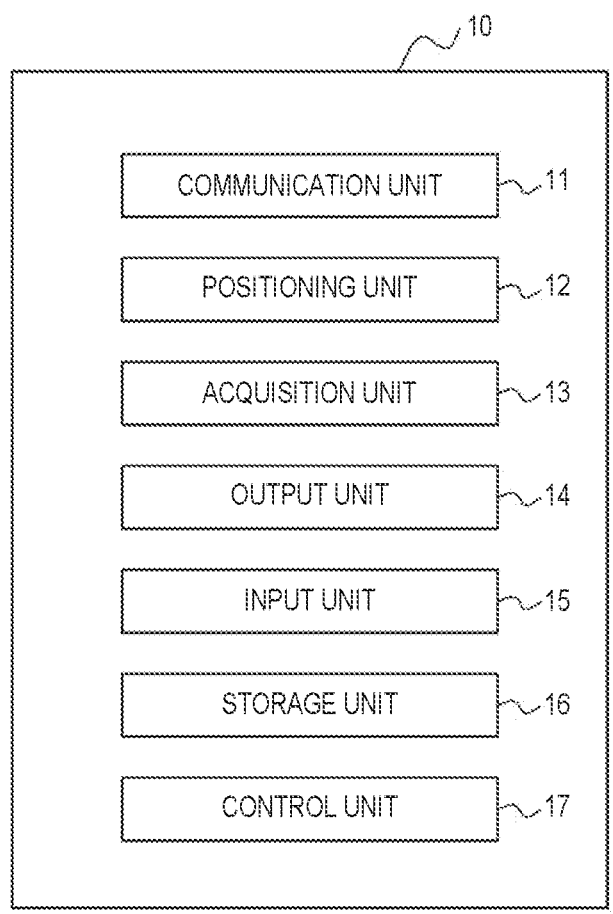
FIG. 2 is a block diagram illustrating a schematic configuration of a control device of a vehicle.
Figure 3:
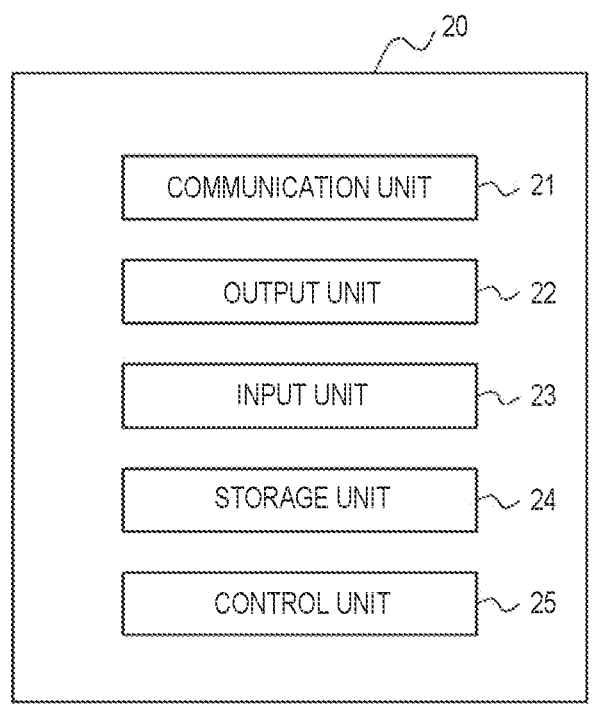
FIG. 3 is a block diagram illustrating a schematic configuration of a server.

Next, each configuration of the vehicle control system 1 will be described in detail with reference to FIGS. 2 and 3. FIG. 2 is a block diagram illustrating a schematic configuration of the control device 10 of the vehicle 2. FIG. 3 is a block diagram illustrating a schematic configuration of the server 20.

Configuration of Control Device of Vehicle

As illustrated in FIG. 2, the control device 10 of the vehicle 2 includes a communication unit 11, a positioning unit 12, an acquisition unit 13, an output unit 14, an input unit 15, a storage unit 16, and a control unit 17. The communication unit 11, the positioning unit 12, the acquisition unit 13, the output unit 14, the input unit 15, the storage unit 16, and the control unit 17 are communicably connected to each other via an in-vehicle network such as controller area network (CAN) or a dedicated line, for example.

The communication unit 11 includes a communication module which connects to the network 40. The communication module is, for example, a communication module compatible with mobile communication standards such as 4th generation (4G) or 5th generation (5G). The communication module may be, for example, a communication module compatible with a standard such as a wired local area network (LAN) or a wireless LAN. The communication module may be a communication module compatible with short-range wireless communication standards such as Wi-Fi (registered trademark), Bluetooth (registered trademark), or infrared communication. In the present embodiment, the control device 10 is connected to the network 40 via the communication unit 11. This allows the control device 10 to communicate with the server 20 and the like. Also, the communication unit 11 of the control device 10 may be communicably connected to each function of the vehicle 2 via an in-vehicle network such as CAN. Thereby, the control device 10 can realize autonomous driving of the vehicle 2 via the communication unit 11.

The positioning unit 12 includes one or more positioning devices capable of generating position information of the vehicle 2. The position information of the vehicle 2 is, for example, coordinates such as two-dimensional coordinates or three-dimensional coordinates of the location where the vehicle 2 exists. The positioning unit 12 generates position information of the vehicle 2 by navigation using a satellite positioning system, autonomous navigation, or a combination thereof. The positioning unit 12 may include a receiver compatible with a satellite positioning system such as the global positioning system (GPS) in order to generate position information of the vehicle 2 by navigation using the satellite positioning system. The positioning unit 12 may include a sensor such as an acceleration sensor or a gyro sensor in order to generate position information of the vehicle 2 by autonomous navigation.

The acquisition unit 13 includes one or more sensors. One or more sensors included in the acquisition unit 13 are installed at positions where information inside the vehicle cabin of the vehicle 2 can be acquired. For example, the acquisition unit 13 may 13 may include a camera installed at a position capable of capturing an image of the vehicle cabin of the vehicle 2. Further, for example, the acquisition unit 13 may include a weight sensor capable of measuring the weight of cargo in the vehicle cabin of the vehicle 2 in addition to/in place of the camera. More specifically, the weight sensor may be a tire air-pressure sensor. In such a case, the weight sensor may determine a load applied to a tire from the change in the air pressure of the tire mounted on the vehicle 2, and measure the weight of the cargo in the vehicle cabin of the vehicle 2. However, the sensor is not limited to a camera or a weight sensor, and may be any sensor such as a contact sensor, an infrared sensor, an illumination sensor, or a vehicle cabin door open/close sensor.

The output unit 14 includes one or more output devices. The output device included in the output unit 14 is, for example, a display, a digital signage, a speaker, or a lamp. The output unit 14 outputs an image, sound, light, or the like.

The input unit 15 includes one or more input devices. The input device included in the input unit 15 is, for example, a touch panel, a camera, a microphone, or the like. The input unit 15 receives an input operation from a user.

The storage unit 16 is, for example, a semiconductor memory, a magnetic memory, or an optical memory. The storage unit 16 may function, for example, as a main storage device, an auxiliary storage device, or a cache memory. The storage unit 16 stores any information used for operation of the control device 10. For example, the storage unit 16 stores a system program, an application program, or an embedded software. The information stored in the storage unit 16 may be acquired from the network 40 via the communication unit 11 and is able to be updated, for example.

The control unit 17 includes one or more processors. The processor may be, for example, a general-purpose processor such as a central processing unit (CPU), or a dedicated processor specialized for specific processing. The control unit 17 is not limited to a processor and may include one or more dedicated circuits. The dedicated circuit may be, for example, a field-programmable gate array (FPGA) or an application specific integrated circuit (ASIC). The control unit 17 controls respective constituent elements in order to realize the functions of the control device 10 including the functions of the above-described constituent elements such as the communication unit 11, the positioning unit 12, the acquisition unit 13, the output unit 14, the input unit 15, the storage unit 16, and the like.

Configuration of Server

Next, with reference to FIG. 3, each configuration of the server 20 will be described in detail. FIG. 3 is a block diagram illustrating a schematic configuration of the server 20.

As illustrated in FIG. 3, the server 20 includes a communication unit 21, an output unit 22, an input unit 23, a storage unit 24, and a control unit 25. The communication unit 21, the output unit 22, the input unit 23, the storage unit 24, and the control unit 25 are connected by wire or wirelessly so as to be able to communicate with each other.

The communication unit 21 includes a communication module which connects to the network 40. The communication module is, for example, a communication module compatible with mobile communication standards such as 4G or 5G. The communication module may be, for example, a communication module compatible with a standard such as wired LAN or wireless LAN. The communication module may be a communication module compatible with short-range wireless communication standards such as Wi-Fi, Bluetooth, or infrared communication. In the present embodiment, the server 20 is connected to the network 40 via the communication unit 21. This allows the server 20 to communicate with the control device 10 of the vehicle 2, the terminal device 30, and the like.

The output unit 22 includes one or more output devices. The output device included in the output unit 22 is, for example, a display, a speaker, or a lamp. The output unit 22 outputs an image, sound, light, or the like.

The input unit 23 includes one or more input devices. The input device included in the input unit 23 is, for example, a touch panel, a camera, or a microphone. The input unit 23 receives an input operation from a user.

The storage unit 24 is, for example, a semiconductor memory, a magnetic memory, or an optical memory. The storage unit 24 may function, for example, as a main storage device, an auxiliary storage device, or a cache memory. The storage unit 24 stores any information used in the operation of the server 20. For example, the storage unit 24 stores a system program, an application program, or an embedded software. The information stored in the storage unit 24 may be acquired from the network 40 via the communication unit 21 and is able to be updated, for example.

The control unit 25 includes one or more processors. The processor may be, for example, a general-purpose processor such as a CPU, or a dedicated processor specialized for specific processing. The control unit 25 is not limited to a processor and may include one or more dedicated circuits. The dedicated circuit may be, for example, an FPGA or an ASIC. The control unit 25 controls respective constituent elements in order to realize the functions of the server 20 including the functions of the above-described constituent elements such as the communication unit 21, the output unit 22, the input unit 23, the storage unit 24, and the like.

Operation of Control Device of Vehicle

The operation of the control device 10 of the vehicle 2 included in the vehicle control system 1 will be described with reference to FIG. 4. FIG. 4 is a flowchart illustrating the operation of the control device 10 of the vehicle. The description of this operation corresponds to the method of controlling the vehicle 2 by the control device 10 of the vehicle.

In this operation example, the vehicle 2 travels by autonomous driving along the travel route described in the travel plan of the vehicle 2 without a driver or conductor while being remotely controlled by an operator at a remote location. Then, it is assumed that the cargo is loaded and unloaded onto and off the vehicle 2 by an on-site worker at the cargo loading/unloading point on the travel route.

In step S101, the control unit 17 of the control device 10 detects loading/unloading of cargo onto/off the vehicle 2.

Any method can be adopted to detect the loading and unloading of cargo onto and off the vehicle 2. For example, when the acquisition unit 13 of the control device 10 includes an open/close sensor for a vehicle cabin door, the control unit 17 may determine that cargo is being loaded and unloaded onto and off the vehicle 2 when the open/close sensor detects that the vehicle cabin door is open. Alternatively, the control unit 17 may 17 may determine that cargo is being loaded and unloaded onto and off the vehicle 2 when it receives information from another computer such as the ECU of the vehicle 2 via the communication unit 11 that the vehicle cabin door of the vehicle 2 is open. The control unit 17 may repeat the operation of step S101 at a predetermined time, and start the operation after step S102 when loading and unloading of cargo is detected.

In step S102, the control unit 17 of the control device 10 acquires loading information indicating the loading state of cargo in the vehicle cabin of the vehicle 2. Hereinafter, the loading information indicating the loading state of the cargo in the vehicle cabin of the vehicle 2 is also referred to as the loading information of the cargo on the vehicle 2.

Any method can be used to acquire the loading information of the cargo on the vehicle 2. For example, when the acquisition unit 13 of the control device 10 includes a camera, the control unit 17 may capture an image of the vehicle cabin of the vehicle 2 with the camera. The control unit 17 may store the image captured by the camera in the storage unit 16 as the loading information of the cargo on the vehicle 2. Further, for example, when the acquisition unit 13 of the control device 10 includes a weight sensor, the control unit 17 may acquire information on the weight of cargo in the vehicle cabin of the vehicle 2 from the weight sensor. The information on the weight of the cargo is, for example, the load applied to each tire calculated based on the change in the air pressure of the tire of the vehicle 2. The control unit 17 may store the information on the weight of the cargo in the vehicle cabin acquired by the weight sensor in the storage unit 16 as the loading information of the cargo on the vehicle 2.

In step S103, the control unit 17 of the control device 10 determines whether the loading information of the cargo on the vehicle 2 meets a predetermined loading condition.

The predetermined loading condition is a cargo loading condition that can affect the safety of cargo or the traveling performance of the vehicle 2. The predetermined loading condition includes conditions such as, for example, that the cargo is unevenly arranged on either the front, rear, left, or right side of the vehicle 2 in the vehicle cabin, that the cargo is loaded with gaps between the cargo, that the cargo may fall over, or that the total weight of the cargo exceeds a specified weight of the vehicle 2. However, the predetermined loading condition is not limited to these. The predetermined loading condition may include that predetermined markings are applied to the cargo in the vehicle cabin. The predetermined indication may be, for example, a sticker such as "Caution for Fragility" or "Handle with Care" indicating that the cargo contains fragile items. As a result, even when the loading condition of the cargo does not meet the predetermined loading condition, the cargo is subject to subsequent processing according to the contents of the cargo, thereby further improving the safety of the cargo and the traveling performance of the vehicle.

Any method can be adopted to determine whether the predetermined loading condition is met. For example, when the loading information of the cargo on the vehicle 2 includes an image captured by a camera, the control unit 17 of the control device 10 may use an analysis algorithm to specify the cargo appearing in the image of the vehicle cabin of the vehicle 2, and extract information on the cargo such as the appearance, shape, placement, or loading position of the specified cargo. Then, the control unit 17 determines whether the extracted information on the cargo meets the predetermined loading condition.

Further, for example, when the loading information of the cargo on the vehicle 2 includes information on the weight of the cargo in the vehicle cabin acquired by the weight sensor, the control unit 17 of the control device 10 may extract the information on the cargo, such as the weight of the cargo in the vehicle cabin and the loading position, based on the magnitude or bias of the load applied to each tire by an analysis algorithm. Then, the control unit 17 determines whether the extracted information on the cargo meets the predetermined loading condition. The control unit 17 may store in the storage unit 16 a determination result as to whether the loading information of the cargo on the vehicle 2 meets the predetermined loading condition.

The analysis algorithm described above may be constructed by a statistical method such as machine learning or deep learning. For example, the analysis algorithm may be constructed and tuned by a statistical method using, as training data, a history of the loading information of the cargo on the vehicle 2 acquired in the past and the result of human evaluation of the loading information of the cargo on the vehicle 2. As a result, the predetermined loading condition is added and updated by accumulating training data, and the accuracy of determination by the analysis algorithm can be improved. However, the analysis algorithm may include predetermined arithmetic processing that does not rely on a statistical method.

When the loading information of the cargo on the vehicle 2 does not meet the predetermined loading condition (No in step S103), the control unit 17 of the control device 10 may terminate this operation without executing subsequent processing. Alternatively, the control unit 17 may perform the process of step S101 again.

When the loading information of the cargo on the vehicle 2 meets the predetermined loading condition (Yes in step S103), the control unit 17 of the control device 10 proceeds to step S104 and issues a notification prompting a change in the loading state of the cargo in the vehicle 2.

Any method can be adopted for the notification prompting a change in the loading state of the cargo in the vehicle 2. For example, the control unit 17 of the control device 10 may issue a notification through the output unit 14 to prompt a change in the loading state of the cargo in the vehicle 2. For example, when the output unit 14 includes a digital signage, the control unit 17 may display the image captured by the camera on the digital signage as a notification prompting a change in the loading state of the cargo in the vehicle 2, by adding highlighting such as applying a red circle to the cargo that meets the predetermined loading condition. As a result, it is possible to prompt the worker who is loading and unloading the cargo onto and off the vehicle cabin of the vehicle 2 to reload the cargo that meets the predetermined loading condition. Also, for example, the control unit 17 may transmit, via the communication unit 11, a notification prompting a change in the loading state of the cargo in the vehicle 2 to the terminal device 30 via the server 20. In such a case, the terminal device 30 can issue a notification to prompt a change in the loading state of the cargo via a display or the like based on the information received from the control device 10. As a result, the terminal device 30 can prompt the operator of the vehicle 2 using the terminal device 30 to remotely control the vehicle 2 and make an announcement or the like to a worker.

In step S105, the control unit 17 of the control device 10 transmits a travel control request for the vehicle 2 considering the loading state of the cargo when the loading information of the cargo on the vehicle 2 meets the predetermined loading condition (Yes in step S103).

An arbitrary method can be adopted for transmitting a travel control request for the vehicle 2 in consideration of the loading state of the cargo. For example, the control unit 17 of the control device 10 may transmit, via the communication unit 11, a travel control request for the vehicle 2 that considers the loading state of the cargo to a computer such as ADS, ADAS, or ECU of the vehicle 2. As a result, the ADS, ADAS, ECU, or the like of the vehicle 2 can control the accelerator, brake, steering wheel, or the like of the vehicle 2 based on the travel control request of the vehicle 2 in consideration of the loading state of the cargo. Further, for example, the control unit 17 may transmit, via the communication unit 11, the travel control request for the vehicle 2 considering the loading state of the cargo to the terminal device 30 via the server 20. As a result, the terminal device 30 can prompt the operator to remotely control the vehicle 2 in consideration of the loading state of the cargo. As a result, the control device 10 can make it difficult for the safety of the cargo loaded in the vehicle cabin or the traveling performance of the vehicle 2 to be lowered even when the problem of the loading condition of the cargo is not resolved despite the notification.

For example, when the vehicle 2 is a vehicle that can travel by autonomous driving, the travel control request for the vehicle 2 considering the loading state of the cargo may include a change in the control value of speed or acceleration in autonomous driving of the vehicle 2. The speed or acceleration in the autonomous driving of the vehicle 2 is also called instructed speed or instructed acceleration. Generally, in autonomous driving, control of traveling of the vehicle 2 is performed by designating an instructed speed or an instructed acceleration. The instructed acceleration is expressed, for example, as acceleration in a 360-degree direction with respect to the vehicle 2, and can be defined by a longitudinal acceleration component in a front-rear direction and a lateral acceleration component in a right-left direction. The ADS, ADAS, ECU, or the like of the vehicle 2 controls the accelerator, brake, steering wheel, or the like of the vehicle 2 based on the instructed speed and the instructed acceleration. Therefore, by changing a control value of speed or acceleration in the autonomous driving of the vehicle 2, the traveling control of the vehicle 2 during the autonomous driving can be corrected in consideration of the loading state of the cargo.

As an example, it is assumed that a set value of the instructed acceleration for stopping the vehicle with no cargo (normal) from reaching a traveling state of 30 km/h is −0.3 G with respect to an advancing direction of the vehicle 2, whereas the set value of the instructed acceleration is changed to −0.15 G to stop the vehicle with cargo from reaching the traveling state of 30 km/h, thereby increasing a braking time for the vehicle 2 to stop. As a result, it is possible to reduce overturning of the vehicle 2 due to overturning of the cargo in the vehicle cabin, lateral G caused by unevenness of the cargo, deterioration of ride comfort, and the like while the vehicle 2 is traveling. The changed control value of the speed or acceleration may be constant, or may be set according to the loading state of the cargo, such as the total weight of the cargo.

However, the change in the control value of the speed or acceleration described above may not be applied in an emergency while the vehicle 2 is traveling. As a result, for example, in an emergency such as avoidance of a collision with a vehicle or a pedestrian in front of a vehicle 2, the safety of the vehicle 2 can be prioritized from the viewpoint of fail-safe. In embodiment with such control, the control unit 17 is configured to determine whether the vehicle 2 is in an emergency.

Further, in step S105, the control unit 17 of the control device 10 may 10 may acquire a measured value of speed or acceleration of the vehicle 2 from an electronic device such as a speedometer or accelerometer installed in the vehicle 2 via the communication unit 11. Then, the control unit 17 may adjust a control value of speed or acceleration based on the measured value of speed or acceleration.

As another example, it is assumed that a set value of the instructed lateral acceleration for cornering at 30 km/h is 0.15 G. When the instructed acceleration is specified in autonomous driving of the vehicle 2, it is assumed that a measured value of lateral acceleration during cornering for the vehicle 2 with no cargo (normal) is 0.15 G, whereas the measure value of lateral acceleration is 0.20 G during cornering for the vehicle 2 with cargo. In such a case, the control unit 17 of the control device 10 adjusts the set value of the instructed lateral acceleration during cornering for vehicle 2 with cargo at 30 km/h from 0.15 G to 0.12 G, thereby causing the measured value to approach the normal value (0.15 G). As a result, it is possible to minimize the discrepancy between the intended control and the actual traveling of the vehicle 2, such as when the vehicle 2 does not turn as intended or does not speed up on a slope due to the increased weight of the vehicle 2 or the biased center of gravity of the vehicle 2 due to the loading of cargo. Alternatively, it is possible to minimize the discrepancy between the intended control and the actual traveling, such as the vehicle 2 curving too much on a curve or accelerating rapidly that is caused by the weight of the vehicle 2 becoming lighter due to the unloading of the cargo. Therefore, the safety of cargo loaded in the vehicle cabin or the traveling performance of the vehicle 2 is less likely to deteriorate.

As described above, the control device 10 according to the present embodiment is the control device 10 of the vehicle 2. The control device 10 acquires the loading information indicating the loading state of cargo in the vehicle cabin of the vehicle 2. The control device 10 determines whether the loading information meets the predetermined loading condition. When the loading information meets the predetermined loading condition, the control device 10 issues a notification prompting a change in the loading state of the cargo.

With such a configuration, the control device 10 of the vehicle 2 can automatically issue a notification prompting a change in the loading state of the cargo when the state of the cargo loaded on the vehicle 2 can affect the safety of the cargo or the traveling performance of the vehicle 2. As a result, even when a person who can manage the cargo in the vehicle cabin is not in the vehicle 2, the safety of the cargo loaded in the vehicle cabin or the traveling performance of the vehicle 2 is less likely to deteriorate. Therefore, with the present embodiment, it is possible to improve the usefulness of the technology for managing the vehicle cabin of the vehicle 2.

Although the present disclosure is described with reference to figures and examples, it should be noted that various variations and modifications may be made by those skilled in the art based on the present disclosure. Therefore, it should be noted that these variations and modifications are included within the scope of the present disclosure. For example, the functions included in each component or each step can be rearranged so as not to be logically inconsistent, and a plurality of components or steps can be combined into one or divided.

For example, an embodiment is possible in which a general-purpose computer functions as the control device 10 according to the above-described embodiment. Specifically, a program describing the processing details for realizing each function of the control device 10 according to the above-described embodiment is stored in a memory of a general-purpose computer, and the program is read out and executed by the processor. Therefore, the present disclosure can also be realized as a processor-executable program or a non-transitory computer-readable medium that stores the program. Non-transitory computer-readable media include, for example, magnetic recording devices, optical disks, magneto-optical recording media, or semiconductor memories.

Also, for example, in the above-described embodiment, the control device 10 is installed in the vehicle 2, but the present invention is not limited to this. The server 20 may be configured to perform part or all of the operations and processes performed by the control device 10. As a result, a processing load on the device installed in the vehicle 2 can be reduced, and the manufacturing cost of the vehicle 2 can be suppressed.

Also, for example, in the above-described embodiment, the control device 10 is described as having both the vehicle cabin management function and the autonomous driving function, but the present invention is not limited to this. A control device having a vehicle cabin management function and a control device having an autonomous driving function may be separately installed in the vehicle 2.

Also, for example, in the above-described embodiment, the control device 10 is described as transmitting a travel control request for a vehicle in consideration of the loading state of the cargo after issuing a notification prompting a change in the loading state of the cargo, but the present invention is not limited to this. The control device 10 may 10 may transmit a travel control request for a vehicle in consideration of the loading state of the cargo without issuing a notification prompting a change in the loading state of the cargo.

Parts of the embodiment of the present disclosure are illustrated below. However, it should be noted that the embodiment of the present disclosure is not limited thereto.

Embodiment 1

A control device a vehicle comprising a control unit configured to:
acquire loading information indicating a loading state of cargo in a vehicle cabin of the vehicle;
determine whether the loading information meets a predetermined loading condition; and
issue a notification prompting a change in the loading state of the cargo when the loading information meets the predetermined loading condition.

Embodiment 2

The control device according to the embodiment 1, wherein the loading information includes an image of the vehicle cabin captured by a camera.

Embodiment 3

The control device according to the embodiment 1 or 2, wherein the loading information includes information on the weight of the cargo in the vehicle cabin acquired by a weight sensor.

Embodiment 4

The control device according to any one of the embodiments 1 to 3, wherein the predetermined loading condition includes that a predetermined marking is applied to the cargo.

Embodiment 5

The control device according to any one of the embodiments 1 to 4, wherein the control unit is further configured to transmit a travel control request for the vehicle in consideration of the loading state of the cargo when the loading information meets the predetermined loading condition.

Embodiment 6

The control device according to the embodiment 5, wherein the vehicle is a vehicle that can travel by autonomous driving; and
the travel control request includes a change in a control value of speed or acceleration during autonomous driving of the vehicle.

Embodiment 7

The control device according to the embodiment 6, wherein the control unit is further configured to:
acquire a measured value of speed or acceleration of the vehicle; and
adjust the control value based on the measured value.

Embodiment 8

The control device according to the embodiment 6 or 7, wherein the change in the control value of the instructed acceleration is not applied in an emergency while the vehicle is traveling.

Embodiment 9

A control method of a vehicle executed by one or more computers comprising:
acquiring loading information indicating a loading state of cargo in a vehicle cabin of the vehicle;
determining whether the loading information meets a predetermined loading condition; and
issuing a notification prompting a change in the loading state of the cargo when the loading information meets the predetermined loading condition.

Embodiment 10

The control method according to the embodiment 9, wherein the loading information includes an image of the vehicle cabin captured by a camera.

Embodiment 11

The control method according to the embodiment 9 or 10, wherein the loading information includes information on the weight of the cargo in the vehicle cabin acquired by a weight sensor.

Embodiment 12

The control method according to any one of the embodiments 9 to 11, wherein the predetermined loading condition includes that a predetermined marking is applied to the cargo.

Embodiment 13

The control method according to any one of the embodiments 9 to 12, wherein the control method further includes transmitting a travel control request for the vehicle in consideration of the loading state of the cargo when the loading information meets the predetermined loading condition.

Embodiment 14

The control method according to the embodiment 13, wherein:
the vehicle is a vehicle that can travel by autonomous driving; and
the travel control request includes a change in a control value of speed or acceleration during autonomous driving of the vehicle.

Embodiment 15

A non-temporary storage medium storing an instruction executable by one or more processors and causing the one or more processors to perform functions comprising:
acquiring loading information indicating a loading state of cargo in a vehicle cabin of the vehicle;
determining whether the loading information meets a predetermined loading condition; and
issuing a notification prompting a change in the loading state of the cargo when the loading information meets the predetermined loading condition.

Embodiment 16

The non-temporary storage medium according to the embodiment 15, wherein the loading information includes an image of the vehicle cabin captured by a camera.

Embodiment 17

The non-temporary storage medium according to the embodiment 15 or 16, wherein the loading information includes information on a weight of the cargo in the vehicle cabin acquired by a weight sensor.

Embodiment 18

A non-temporary storage medium according to any one of the embodiments 15 to 17, wherein the predetermined loading condition includes that a predetermined marking is applied to the cargo.

Embodiment 19

The non-temporary storage medium according to any one of the embodiments 15 to 18, wherein the functions further include transmitting a travel control request for the vehicle in consideration of the loading state of the cargo when the loading information meets the predetermined loading condition.

Embodiment 20

A non-temporary storage medium according to the embodiment 19, wherein:
the vehicle is a vehicle that can travel by autonomous driving; and
the travel control request includes a change in a control value of speed or acceleration during autonomous driving of the vehicle.

What is claimed is:

1. A control device of a vehicle comprising a control unit configured to:
   acquire loading information indicating a loading state of cargo in a vehicle cabin of the vehicle;
   determine whether the loading information meets a predetermined loading condition;
   issue a notification prompting a change in the loading state of the cargo when the loading information meets the predetermined loading condition; and
   transmit a travel control request for the vehicle, taking into consideration of the loading state of the cargo including whether there was a change in the loading state, when the loading information still meets the predetermined loading condition.

2. The control device according to claim 1, wherein the loading information includes an image of the vehicle cabin captured by a camera.

3. The control device according to claim 1, wherein the loading information includes information on a weight of the cargo in the vehicle cabin acquired by a weight sensor.

4. The control device according to claim 1, wherein the predetermined loading condition includes that a predetermined marking is applied to the cargo.

5. The control device according to claim 1, wherein:
   the vehicle is a vehicle that is able to travel by autonomous driving; and
   the travel control request includes a change in a control value of speed or acceleration during autonomous driving of the vehicle.

6. The control device according to claim 1, wherein the control unit is further configured to:
   acquire a measured value of speed or acceleration of the vehicle; and
   adjust the control value based on the measured value.

7. The control device according to claim 1, wherein the control unit is configured not to change the control value in an emergency while the vehicle is traveling.

8. A control method of a vehicle executed by one or more computers comprising:
   acquiring loading information indicating a loading state of cargo in a vehicle cabin of the vehicle;
   determining whether the loading information meets a predetermined loading condition;
   issuing a notification prompting a change in the loading state of the cargo when the loading information meets the predetermined loading condition;
   transmitting a travel control request for the vehicle, taking into consideration of the loading state of the cargo including whether there was a change in the loading state, when the loading information still meets the predetermined loading condition.

9. The control method according to claim 8, wherein the loading information includes an image of the vehicle cabin captured by a camera.

10. The control method according to claim 8, wherein the loading information includes information on a weight of the cargo in the vehicle cabin acquired by a weight sensor.

11. The control method according to claim 8, wherein the predetermined loading condition includes that a predetermined marking is applied to the cargo.

12. The control method according to claim 8, wherein:
    the vehicle is a vehicle that is able to travel by autonomous driving; and
    the travel control request includes a change in a control value of speed or acceleration during autonomous driving of the vehicle.

13. A non-transitory storage medium storing an instruction executable by one or more processors and causing the one or more processors to perform functions comprising:
    acquiring loading information indicating a loading state of cargo in a vehicle cabin of a vehicle;
    determining whether the loading information meets a predetermined loading condition;
    issuing a notification prompting a change in the loading state of the cargo when the loading information meets the predetermined loading condition; and
    transmitting a travel control request for the vehicle, taking into consideration of the loading state of the cargo including whether there was a change in the loading state, when the loading information still meets the predetermined loading condition.

14. The non-transitory storage medium according to claim 13, wherein the loading information includes an image of the vehicle cabin captured by a camera.

15. The non-transitory storage medium according to claim 13, wherein the loading information includes information on a weight of the cargo in the vehicle cabin acquired by a weight sensor.

16. The non-transitory storage medium according to claim 13, wherein the predetermined loading condition includes that a predetermined marking is applied to the cargo.

17. The non-transitory storage medium according to claim 15, wherein:
    the vehicle is a vehicle that is able to travel by autonomous driving; and
    the travel control request includes a change in a control value of speed or acceleration during autonomous driving of the vehicle.

18. The control device according to claim 1, wherein the predetermined loading condition is one of: that the cargo is unevenly arranged on either a front, rear, left, or right side of the vehicle in the vehicle cabin, that the cargo is loaded with gaps between the cargo, that the cargo may fall over, or that a total weight of the cargo exceeds a specified weight of the vehicle.

19. The control method according to claim 8, wherein the predetermined loading condition is one of: that the cargo is unevenly arranged on either a front, rear, left, or right side of the vehicle in the vehicle cabin, that the cargo is loaded with gaps between the cargo, that the cargo may fall over, or that a total weight of the cargo exceeds a specified weight of the vehicle.

20. The non-transitory storage medium according to claim 13, wherein the predetermined loading condition is one of: that the cargo is unevenly arranged on either a front, rear, left, or right side of the vehicle in the vehicle cabin, that the cargo is loaded with gaps between the cargo, that the cargo may fall over, or that a total weight of the cargo exceeds a specified weight of the vehicle.

* * * * *